(12) United States Patent
Shibata et al.

(10) Patent No.: US 11,924,740 B2
(45) Date of Patent: Mar. 5, 2024

(54) SIGNAL TRANSFER SYSTEM, SIGNAL TRANSFER DEVICE, ROUTE CONTROL DEVICE AND SIGNAL TRANSFER METHOD

(71) Applicant: NIPPON TELEGRAPH AND TELEPHONE CORPORATION, Tokyo (JP)

(72) Inventors: Naotaka Shibata, Musashino (JP); Hiroyuki Uzawa, Musashino (JP); Hirotaka Ujikawa, Musashino (JP); Yoichi Fukada, Musashino (JP); Jun Terada, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 210 days.

(21) Appl. No.: 17/601,849

(22) PCT Filed: Mar. 26, 2020

(86) PCT No.: PCT/JP2020/013834
§ 371 (c)(1),
(2) Date: Oct. 6, 2021

(87) PCT Pub. No.: WO2020/209091
PCT Pub. Date: Oct. 15, 2020

(65) Prior Publication Data
US 2022/0210718 A1    Jun. 30, 2022

(30) Foreign Application Priority Data
Apr. 10, 2019    (JP) .................................. 2019-074801

(51) Int. Cl.
*H04L 45/00* (2022.01)
*H04L 47/24* (2022.01)
(Continued)

(52) U.S. Cl.
CPC .......... *H04W 40/248* (2013.01); *H04L 45/70* (2013.01); *H04L 47/24* (2013.01); *H04W 8/04* (2013.01)

(58) Field of Classification Search
None
See application file for complete search history.

(56) References Cited

U.S. PATENT DOCUMENTS

| 6,891,795 B1 * | 5/2005 | Hamachi | H04L 45/02 370/227 |
| 2019/0110227 A1 * | 4/2019 | Lepp | H04W 72/12 |

(Continued)

FOREIGN PATENT DOCUMENTS

| JP | 2001217839 A * | 8/2001 | H04L 45/02 |
| WO | WO-2007010131 A2 * | 1/2007 | H04W 52/0216 |

OTHER PUBLICATIONS

LAN/MAN Standards Committee of the IEEE Computer Society, Time-Sensitive Networking for Fronthaul, IEEE Std 802.1CM-2018, IEEE Standard for Local and metropolitan area networks, May 7, 2018.

(Continued)

*Primary Examiner* — The Hy Nguyen
(74) *Attorney, Agent, or Firm* — Harness, Dickey & Pierce, P.L.C.

(57) ABSTRACT

A signal forwarding system includes: a plurality of signal forwarding devices forming a plurality of communication routes between a slave station and a master station; and a route control device that determines a communication route, wherein the route control device includes at least: a communication route calculation unit that calculates a communication route in response to a route switching request; and a forward destination setting instruction unit that outputs forward destination setting information based on the communication route, the signal forwarding devices include at (Continued)

least: a forward destination setting instruction acquisition unit that acquires the forward destination setting information; a forward destination set unit that changes a forward destination based on the forward destination setting information; and a forward unit that outputs input traffic based on the forward destination, and any of the route control device and the signal forwarding devices includes: a traffic monitor unit; a non-signal period estimation unit that estimates a non-signal period in which the traffic does not flow; and a switching timing control unit that controls a switching timing to perform route switching in the non-signal period.

6 Claims, 13 Drawing Sheets

(51) Int. Cl.
*H04W 8/04* (2009.01)
*H04W 40/24* (2009.01)

(56) References Cited

U.S. PATENT DOCUMENTS

2022/0200908 A1* 6/2022 Rivaud ................. H04L 45/245
2022/0210718 A1* 6/2022 Shibata .................. H04L 45/70

OTHER PUBLICATIONS

Daisuke Hisano et al., Gate-Shrunk Time Aware Shaper for Accommodating Fronthaul and IoT Services in Layer-2 NW, 2017 IEICE Communication Society Convention, Sep. 12, 2017.
Daisuke Hisano et al., TDD Pattern Estimation and Auto-Recovery from Estimation Error for Accommodations of Fronthaul and Secondary Services in TDM-PON, Journal of Optical Communications and Networking, vol. 10, No. 2, 2018.

* cited by examiner

SIGNAL TRANSFER SYSTEM, SIGNAL TRANSFER DEVICE, ROUTE CONTROL DEVICE AND SIGNAL TRANSFER METHOD

CROSS-REFERENCE TO RELATED APPLICATIONS

This application is a 371 U.S. National Phase of International Application No. PCT/JP2020/013834 filed on Mar. 26, 2020, which claims priority to Japanese Application No. 2019-074801 filed on Apr. 10, 2019. The entire disclosures of the above applications are incorporated herein by reference.

TECHNICAL FIELD

The present invention pertains to a route switching technique for forwarding a signal communicated between a plurality of slave stations and a master station, and relates to a signal forwarding system, a signal forwarding device, a route control device and a signal forwarding method.

BACKGROUND ART

Mobile fronthaul (MFH), mobile backhaul (MBH) and the like are known as networks for constituting a cellular system. MBH is a network that connects a base station and an integration station that controls the base station, and is constituted by layer 2 switches, layer 3 switches (routers) and the like. On the other hand, when a base station is separately arranged as a wireless control device and wireless devices, MFH is a network that connects the wireless control device and the wireless device. Although point-to-point connection has been conventionally used in a section connecting the wireless control device and the wireless devices, it is under consideration to establish a network with layer 2 switches connected in a multistage manner (see Non-Patent Literature 1, for example), which has higher redundancy than the point-to-point connection.

FIG. 9 shows an example of a common signal forwarding system 700. In FIG. 9, the signal forwarding system 700 includes a plurality of signal forwarding devices 701 and a route control device 702 controlling the plurality of signal forwarding devices 701, and the signal forwarding devices 701 forward communications between slave stations 703 communicating with wireless terminals and master station 704 controlling the slave stations 703. Here, in FIG. 9, a plurality of similar devices are denoted by adding (number) to the end of their reference numerals. For example, in FIG. 9, in order to designate the individual slave stations, they are denoted by adding (number) to the end of their reference numerals such as a slave station 703(1), a slave station 703(2) and a slave station 703(3), and for commonalities between the individual slave stations, they are denoted as slave stations 703 by omitting (number) at the end of their reference numerals. The signal forwarding devices 701 are denoted similarly.

The configuration example in FIG. 9 can be applied to both of MFH and MBH. In the case of MFH, the slave stations 703 correspond to the wireless devices, and the master station 704 corresponds to the wireless control device. In the case of MBH, the slave stations 703 correspond to the base stations, and the master station 704 corresponds to the integration station. The signal forwarding devices 701 correspond to layer 2 switches, layer 3 switches or the like. Here, the communication between the slave stations 703 and the master station 704 can take a plurality of routes. The route control device 702 determines one communication route between the slave stations 703 and the master station 704, and the forward destination of each signal forwarding device 701 is controlled. Here, possible methods for route control include a method of assigning a route having a small hop count to each communication, a method of calculating a cost value of each route and assigning a route having the minimum cost value, and the like.

FIG. 10 shows an example where a route having the minimum hop count is assigned to the communication between the slave stations 703 and the master station 704. Here, assuming that the required bandwidth for the communication between the slave station 703(1) and the master station 704 is 2 Gbps, the required bandwidth for the communication between the slave station 703(2) and the master station 704 is 5 Gbps, and the required bandwidth for the communication between the slave station 703(3) and the master station 704 is 6 Gbps, a bandwidth of 7 Gbps in total is required between the signal forwarding device 701(4) and the signal forwarding device 701(7) because of the multiplexing of the communication between the slave station 703(1) and the slave station 703(2) and the master station 704. Here, the route control device 702 may switch a route once determined to another route. For example, when the required bandwidth between the slave station 703(2) and the master station 704 increases in speed from 5 Gbps to 9 Gbps after the route shown in FIG. 10 is set, the total required bandwidth for the communication between the slave station 703(1) and the slave station 703(2) and the master station 704 is 11 Gbps between the signal forwarding device 701(4) and the signal forwarding device 701(7). Assuming that the transmission capacity between the signal forwarding devices 701 is 10 Gbps, the above-mentioned 11 Gbps transmission fails, and a loss of frames or packets occurs. Thus, the route needs to be switched such that the required bandwidth is equal to or less than the transmission capacity.

FIG. 11 shows an example of switching the route such that the required bandwidth is equal to or less than the transmission capacity. Note that FIG. 11 corresponds to the signal forwarding system 700 in FIG. 9 and FIG. 10. In the example of FIG. 11, when the required bandwidth between the slave station 703(2) and the master station 704 increases in speed from 5 Gbps to 9 Gbps, the route of the signal forwarding devices 701(1)→703(4)→703(7) in FIG. 10 is switched to the route of the signal forwarding devices 701(1)→703(2)→703(5)→703(8)→703(7). Between the signal forwarding device 701(8) and the signal forwarding device 701(7), 8 Gbps is required in total because of the multiplexing of the communication between the slave station 703(1) and the slave station 703(3) and the master station 704. However, since the transmission capacity between the signal forwarding devices 701 is less than or equal to 10 Gbps, transmission can be performed without a frame or packet loss. Similarly, since the transmission capacity is less than or equal to 10 Gbps for the communication between the slave station 703(2) and the master station 704, transmission can be performed without a frame or packet loss.

Although examples of performing route switching with a change in required bandwidth as a trigger are described above, other possible triggers for the route switching include, for example, cable construction in a particular section, change of the installation location of the master station 704 to be connected, and the like.

FIG. 12 shows a configuration example of the signal forwarding device 701 and the route control device 702 in the prior art. In FIG. 12, the route control device 702 includes a communication route calculation unit 801 that calculates a forward destination communication route in response to a route switching request, and a forward destination setting instruction unit 802 that outputs an instruction of switching the forward destination (forward destination setting information) to each signal forwarding device 701 based on the calculated communication route. The signal forwarding device 701 includes a forward destination setting instruction acquisition unit 901 that acquires the forward destination setting information from the route control device 702, a forward destination set unit 902 that changes the forward destination based on the forward destination setting information acquired by the forward destination setting instruction acquisition unit 901, and a forward unit 903 that outputs input traffic as output traffic based on the forward destination set by the forward destination set unit 902.

Here, when the route switching request is a request triggered when a cable section becomes unavailable due to cable construction, the communication route calculation unit 801 calculates a route bypassing the cable section. On the other hand, when the route switching request is a request triggered by the increase in speed of the required bandwidth in a particular section, the communication route calculation unit 801 calculates a communication route such that there is no section in which the required bandwidth exceeds the transmission capacity.

CITATION LIST

Non-Patent Literature

Non-Patent Literature 1: "Time-Sensitive Networking for Fronthaul", IEEE Std 802.1CM, May 7, 2018
Non-Patent Literature 2: Hisano, et, al., "Layer 2NW niyoru mobile/IoT service syuuyou wo soutei shita gate syukutai gata Time Aware Shaper no teian (proposal of gate-shrunk Time Aware Shaper assuming mobile/IoT service accommodation by layer 2NW)", IEICE Society Conference B-8-23, September 2017
Non-Patent Literature 3: D. Hisano, et, al., "TDD pattern estimation and auto-recovery from estimation error for accommodations of fronthaul and secondary services in TDM-PON, "J. Opt Commun. Netw., vol. 10, no. 2, February 2018.

SUMMARY OF THE INVENTION

Technical Problem

FIG. 13 shows an example of a prior art problem. FIG. 13(*a*) shows an example in which a slave station 703 and a master station 704 are connected by a network 750 including a plurality of signal forwarding devices 701 and route switching from a route 1 having a longer distance to a route 2 having a shorter distance is performed. FIG. 13(*b*) shows an example of signals sent by the slave station 703 and signals received by the master station 704. Here, the signals sent from the slave station 703 to the master station 704 are sent in bursts. In the example of FIG. 13(*b*), after frames #1 to #9 of a signal (1) are sent in bursts, frames #1 to #7 of a next signal (2) are sent in bursts after an intervening non-signal period.

In FIG. 13(*a*), in the prior art, route switching may occur at a timing in a signal period in which traffic flows in the signal forwarding device 701 constituting the network 750. If the delay time ($\Delta t2$) of the forward destination route (route 2) is smaller than the delay time ($\Delta t1$) of the original route (route 1), the order of frames received at the termination (receiving side) of the route is reversed. In the example of FIG. 13(*b*), route switching is performed in a signal period in which frames #1 to #7 of the signal (2) are being sent in bursts, and the frame #5 transmitted through the route 2 is received at the master station 704 side before the frame #4 sent through the route 1, causing a problem that the order of received frames is reversed. When the order reversal occurs, retransmission may be performed because the frames are not received in an expected order, and this may lower the communication efficiency. Although it is possible to use the signal forwarding devices to correct the order reversal, the need for providing all the signal forwarding devices with such a mechanism leads to an increase in device cost.

It is an objective of the present invention to provide a signal forwarding system, a signal forwarding device, a route control device and a signal forwarding method in which, by switching between communication routes at a timing when no traffic is flowing in the signal forwarding device, the switching between the communication routes can be performed without reversal of the order of received frames even in the case of switching from a route with a larger delay time to a route with a smaller delay time.

Means for Solving the Problem

A first invention is a signal forwarding system including: a slave station; a master station; a plurality of signal forwarding devices forming a plurality of communication routes between the slave station and the master station; and a route control device that determines a communication route of a signal communicated between the slave station and the master station, wherein the route control device includes at least: a communication route calculation unit that calculates a forward destination communication route in response to a route switching request; and a forward destination setting instruction unit that outputs forward destination setting information to the signal forwarding devices based on the communication route calculated by the communication route calculation unit, the signal forwarding devices include at least: a forward destination setting instruction acquisition unit that acquires the forward destination setting information from the route control device; a forward destination set unit that changes a forward destination of the signal based on the forward destination setting information acquired from the forward destination setting instruction acquisition unit; and a forward unit that outputs input traffic based on the forward destination, and any of the route control device and the signal forwarding devices includes: a traffic monitor unit that monitors the traffic; a non-signal period estimation unit that estimates a non-signal period in which the traffic does not flow based on the traffic monitored by the traffic monitor unit; and a switching timing control unit that controls a timing of switching the communication route to perform route switching in the non-signal period estimated by the non-signal period estimation unit.

In a second invention, in the first invention, the non-signal period estimation unit calculates a burst period and a maximum value or an average value of a burst length of the input traffic, and estimates the non-signal period as a period from a point of time after the maximum value or the average value of the burst length plus a predetermined adjustment time from the burst period to an end of the burst period.

In a third invention, in the first invention, the traffic monitor unit monitors upstream and downstream traffic, the non-signal period estimation unit separately estimates an upstream non-signal period and a downstream non-signal period according to a TDD configuration, and the switching timing control unit controls the timing of switching the communication route to perform downstream route switching in the upstream non-signal period and perform upstream route switching in the downstream non-signal period.

In a fourth invention, in the first invention, the traffic monitor unit monitors higher-priority traffic and lower-priority traffic, the non-signal period estimation unit separately estimates a non-signal period of the higher-priority traffic or a communicable period of a lower-priority signal and a non-signal period of the lower-priority traffic or a communicable period of a higher-priority signal, and the switching timing control unit controls control of the timing of switching the communication route to perform route switching of the lower-priority traffic in the communicable period of the higher-priority signal and perform route switching of the higher-priority traffic in the communicable period of the lower-priority signal.

A fifth invention is a plurality of signal forwarding devices that are controlled by a route control device, form a plurality of communication routes, and forward a signal communicated between a slave station and a master station, the signal forwarding devices including: a forward destination setting instruction acquisition unit that acquires forward destination setting information from the route control device; a forward destination set unit that changes a forward destination of the signal based on the forward destination setting information acquired from the forward destination setting instruction acquisition unit; and a forward unit that outputs input traffic based on the forward destination, wherein the signal forwarding devices and the route control device jointly include at least one of: a traffic monitor unit that monitors the traffic; a non-signal period estimation unit that estimates a non-signal period in which the traffic does not flow based on the traffic monitored by the traffic monitor unit; and a switching timing control unit that controls a timing of switching the communication route to perform route switching in the non-signal period estimated by the non-signal period estimation unit.

A sixth invention is a route control device that controls a plurality of signal forwarding devices forming a plurality of communication routes between a slave station and a master station and determines a communication route of a signal communicated between the slave station and the master station, wherein the route control device includes: a communication route calculation unit that calculates a forward destination communication route in response to a route switching request; and a forward destination setting instruction unit that outputs forward destination setting information to the signal forwarding devices based on the communication route calculated by the communication route calculation unit, the route control device and the signal forwarding devices jointly include at least one of: a traffic monitor unit that monitors traffic; a non-signal period estimation unit that estimates a non-signal period in which the traffic does not flow based on the traffic monitored by the traffic monitor unit; and a switching timing control unit that controls a timing of switching the communication route to perform route switching in the non-signal period estimated by the non-signal period estimation unit.

A seventh invention is a plurality of signal forwarding devices that are controlled by a route control device, form a plurality of communication routes and forward a signal communicated between a slave station and a master station, the signal forwarding devices including: a forward destination setting instruction acquisition unit that acquires forward destination setting information from the route control device; a forward destination set unit that changes a forward destination of the signal based on the forward destination setting information acquired from the forward destination setting instruction acquisition unit; a priority sort unit that sorts input traffic by priority; a higher-priority traffic buffer and a lower-priority traffic buffer that hold the traffic sorted by the priority sort unit; a forward unit that outputs traffic output from the higher-priority traffic buffer or the lower-priority traffic buffer based on the forward destination; a switching timing control unit that controls switching of the communication route based on an output timing of outputting a signal from the higher-priority traffic buffer and the lower-priority traffic buffer; and a send timing control unit that controls the output timing and notifies the switching timing control unit of the output timing.

An eighth invention is a signal forwarding method in a signal forwarding system including: a slave station; a master station; a plurality of signal forwarding devices forming a plurality of communication routes between the slave station and the master station; and a route control device that determines a communication route of a signal communicated between the slave station and the master station, wherein the route control device performs at least: a communication route calculating process of calculating a forward destination communication route in response to a route switching request; and a forward destination setting instructing process of outputting forward destination setting information to the signal forwarding devices based on the communication route calculated in the communication route calculating process, the signal forwarding devices perform at least: a forward destination setting instruction acquiring process of acquiring the forward destination setting information from the route control device; a forward destination setting process of changing a forward destination of the signal based on the forward destination setting information acquired in the forward destination setting instruction acquiring process; and a forwarding process of outputting input traffic based on the forward destination, and any of the route control device and the signal forwarding devices performs: a traffic monitoring process of monitoring the traffic; a non-signal period estimating process of estimating a non-signal period in which the traffic does not flow based on the traffic monitored in the traffic monitoring process; and a switching timing control process of controlling a timing of switching the communication route to perform route switching in the non-signal period estimated in the non-signal period estimating process.

Effects of the Invention

In the signal forwarding system, the signal forwarding device, the route control device and the signal forwarding method according to the present invention, by switching between communication routes at a timing when no traffic is flowing in the signal forwarding device, the switching between the communication routes can be performed without reversal of the order of received frames even in the case of switching from a route with a larger delay time to a route with a smaller delay time.

DESCRIPTION OF EMBODIMENTS

Embodiments of a signal forwarding system, a signal forwarding device, a route control device and a signal forwarding method according to the present invention will be described below with reference to the drawings.

First Embodiment

Figure 1:
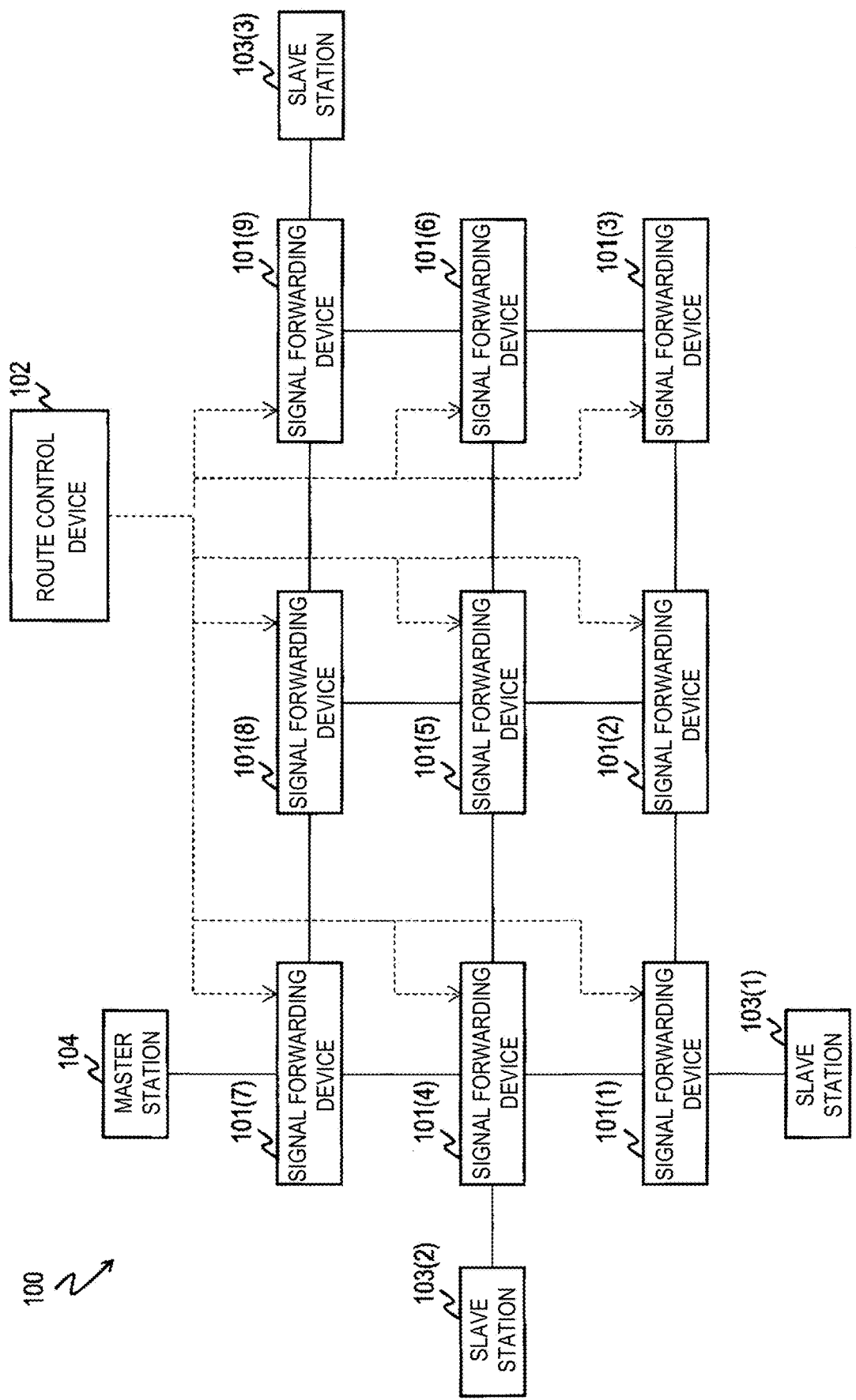
FIG. 1 is a diagram showing an example of a signal forwarding system according to a first embodiment.

FIG. 1 shows an example of a signal forwarding system 100 according to a first embodiment. Although the system configuration itself of the signal forwarding system 100 in FIG. 1 is the same as that of the signal forwarding system 700 in FIG. 9 described for the prior art, they are different in the operation of signal forwarding devices 101 and a route control device 102 as described later. In FIG. 1, the signal forwarding system 100 includes a plurality of signal forwarding devices 101 and a route control device 102 controlling the plurality of signal forwarding devices 101. The signal forwarding devices 101 form communication routes between slave stations 103 communicating with wireless terminals and a master station 104 controlling the slave stations 103, and forward signals between the slave stations 103 and the master station 104. Here, in FIG. 1, a plurality of similar devices are denoted by adding (number) to the end of their reference numerals as in FIG. 9 for the prior art. For example, in FIG. 1, there are three slave stations 103, and in order to designate the individual slave stations 103, they are denoted by adding (number) to the end of their reference numerals such as a slave station 103(1), a slave station 103(2) and a slave station 103(3). For commonalities between the individual slave stations, they are denoted as slave stations 103 by omitting (number) at the end of their reference numerals. Similarly, there are nine signal forwarding devices 101, and in order to designate the individual signal forwarding devices, they are denoted by adding (number) to the end of their reference numerals such as a signal forwarding device 101(1), a signal forwarding device 101(2), a signal forwarding device 101(3), a signal forwarding device 101(4), a signal forwarding device 101(5), a signal forwarding device 101(6), a signal forwarding device 101(7), a signal forwarding device 101(8) and a signal forwarding device 101(9). For commonalities between the individual signal forwarding devices, they are denoted as signal forwarding devices 101 by omitting (number) at the end of their reference numerals.

Figure 9:
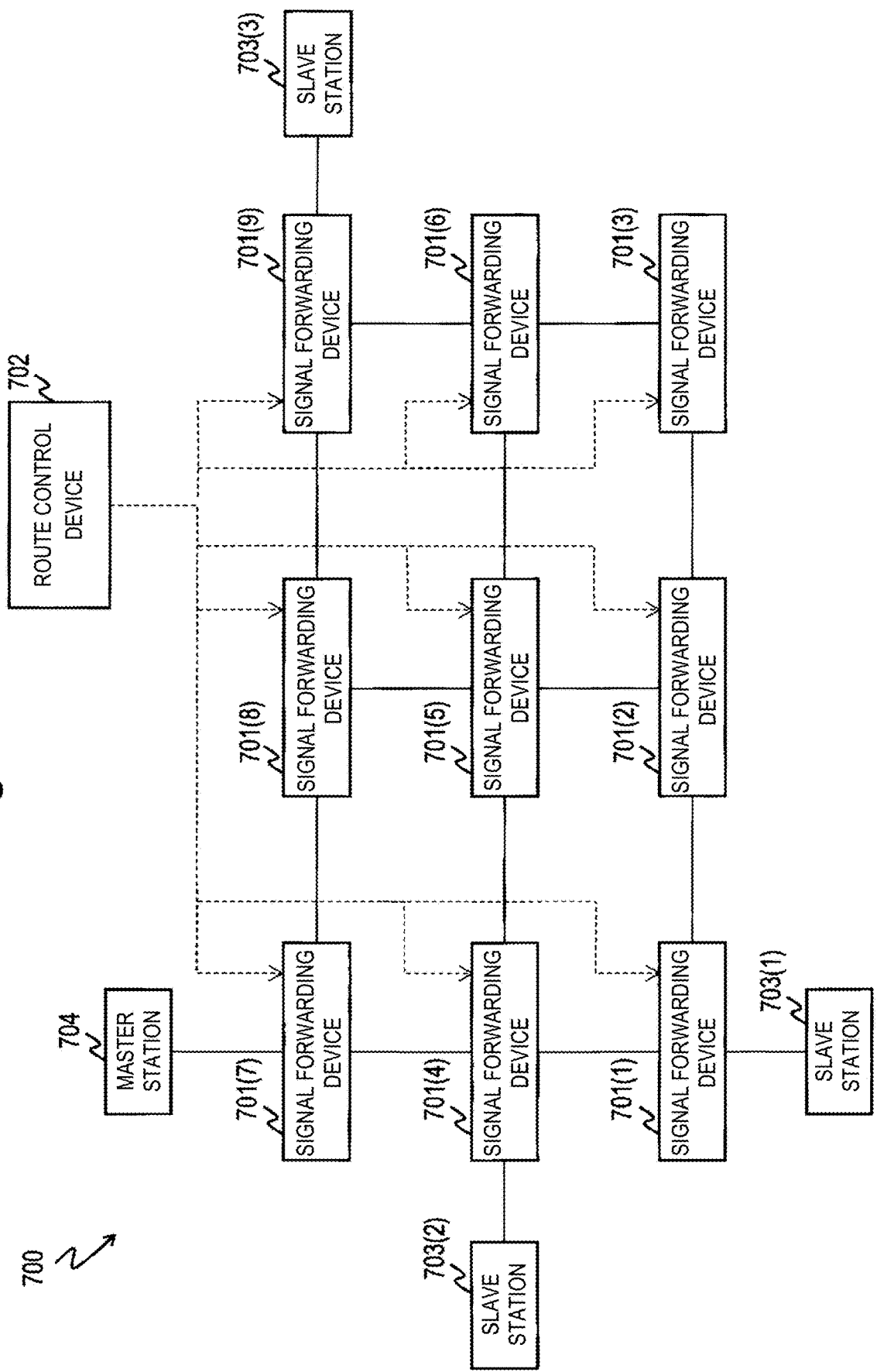
FIG. 9 is a diagram showing an example of a common signal forwarding system.

The system configuration example in FIG. 1 can be applied to both of MFH and MBH as described in FIG. 9 for the prior art. In the case of MFH, the slave stations 103 correspond to wireless devices, and the master station 104 corresponds to a wireless control device. In the case of MBH, the slave stations 103 correspond to base stations, and the master station 104 corresponds to an integration station. The signal forwarding devices 101 correspond to devices such as layer 2 switches, layer 3 switches or the like. The route control device 102 is a device for controlling route switching of the signal forwarding devices 101 or the like.

In FIG. 1, the communication between the slave stations 103 and the master station 104 can take a plurality of routes. As described for the prior art, if the shape of the network is ring-type, for example, there are two route types: clockwise and counterclockwise, and if it is mesh-type or honeycomb-type, two or more routes can be taken. Thus, the route control device 102 determines one communication route between the slave stations 103 and the master station 104, and the forward destination (which may also be referred to as "output destination") of each signal forwarding device 101 is controlled. Possible methods for route control include a method of assigning a route having a small hop count to each communication, a method of calculating a cost value of each route and assigning a route having the minimum cost value, and the like.

The signal forwarding system 100 according to the first embodiment will be described in detail below.

For the signal forwarding system 100 according to the first embodiment, three configuration examples of configuration example (1), configuration example (2) and configuration example (3) are possible, and a basic function of monitoring traffic of the signal forwarding devices 101 to estimate a non-signal period and controlling switching timing to perform route switching in the non-signal period is common to them.

Configuration Example (1)

Figure 2:
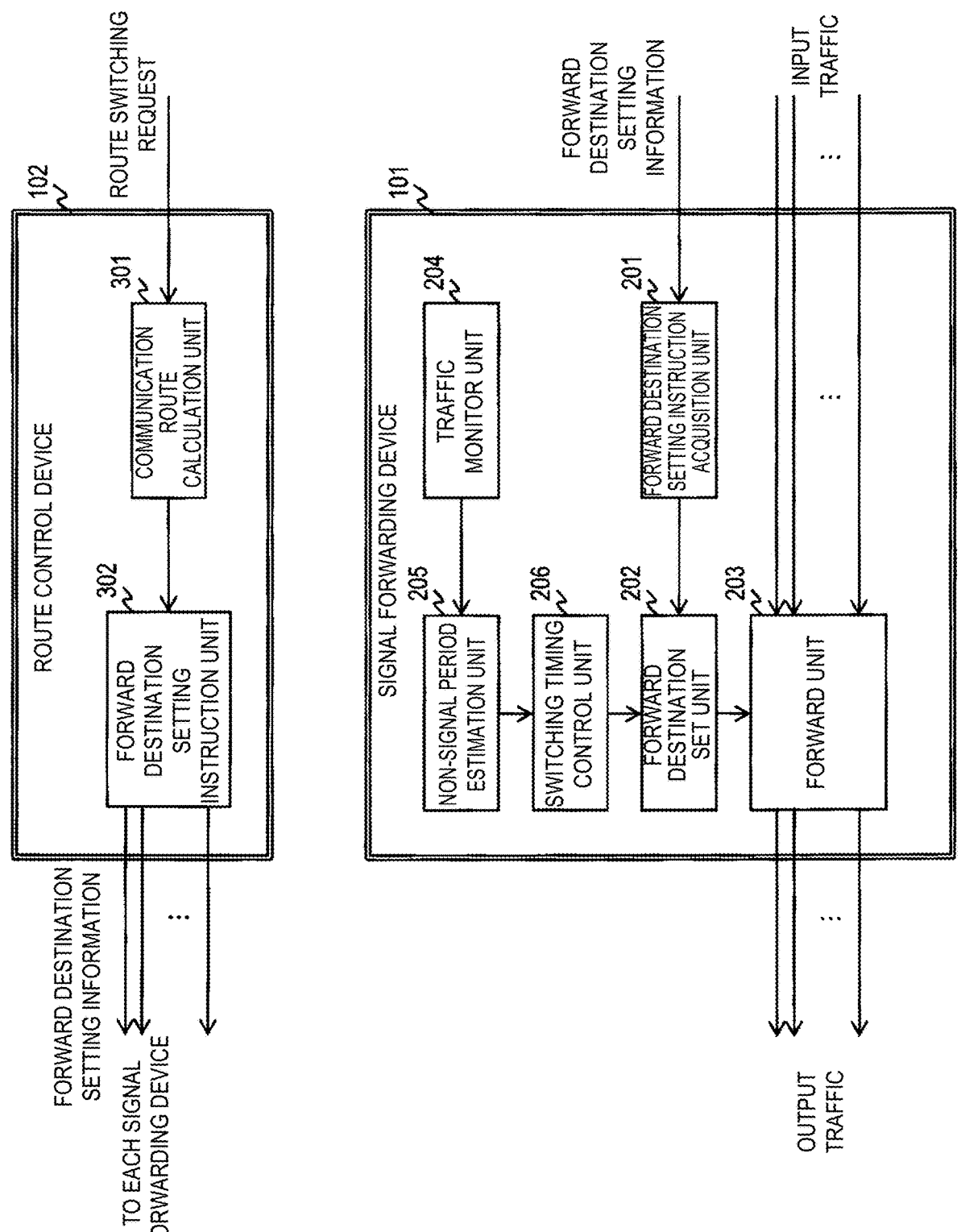
FIG. 2 is a diagram showing a configuration example (1) of a signal forwarding device and a route control device according to the first embodiment.
Figure 12:
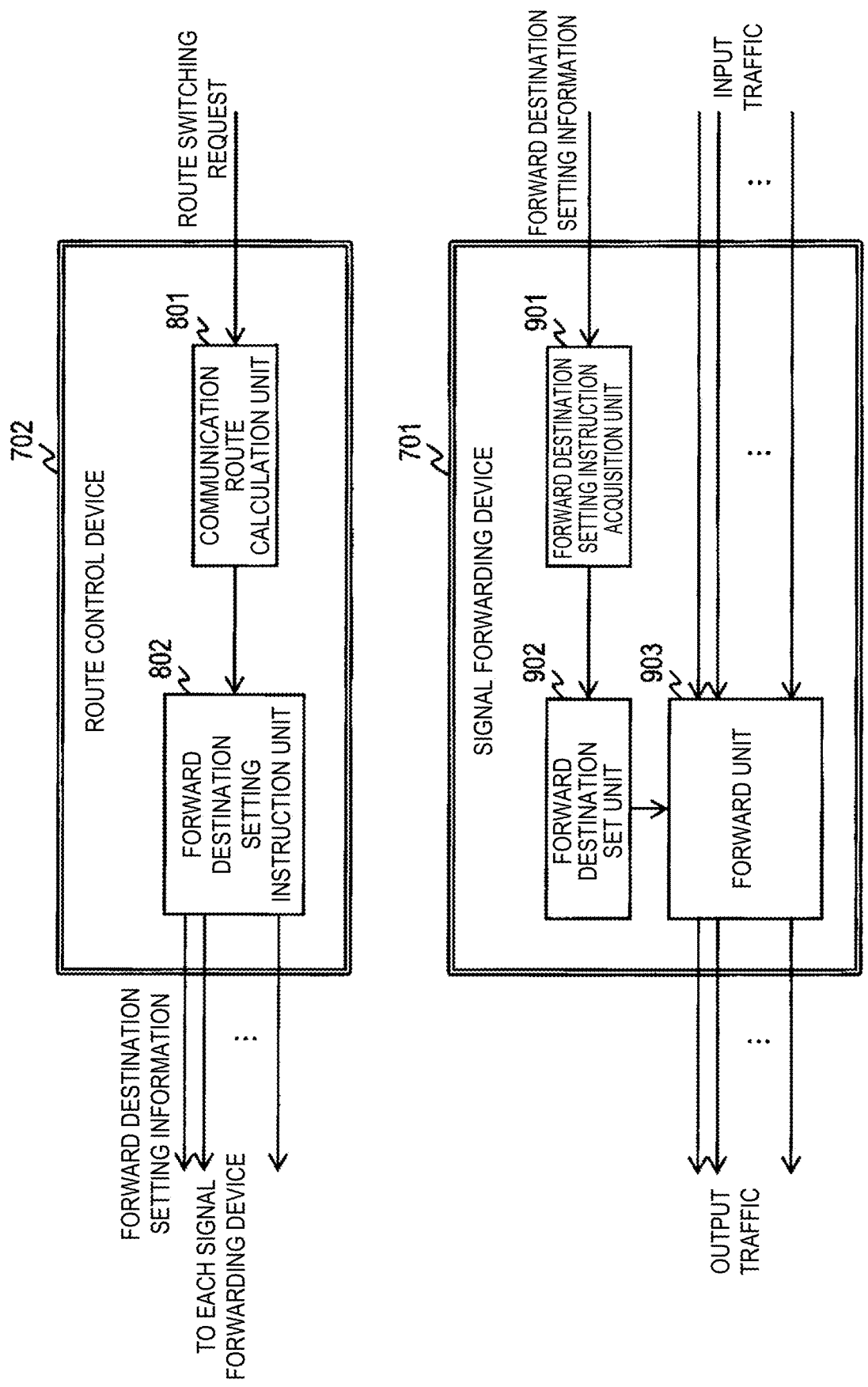
FIG. 12 is a diagram showing a configuration example of a conventional signal forwarding device and a route control device.

FIG. 2 shows a configuration example (1) of a signal forwarding device 101 and a route control device 102 according to the first embodiment. Note that, in the configuration example (1), the plurality of signal forwarding devices 101 and the route control device 102 of the signal forwarding system 100 described in FIG. 1 correspond to the signal forwarding device 101 and the route control device 102 shown in FIG. 2, respectively. Here, in the configuration example (1), the route control device 102 in FIG. 2 has the same configuration as the route control device 702 in FIG. 12 described for the prior art, and only the configuration of the signal forwarding device 101 is different from that of the signal forwarding device 701 described for the prior art.

In FIG. 2, the signal forwarding device 101 includes a forward destination setting instruction acquisition unit 201, a forward destination set unit 202, a forward unit 203, a traffic monitor unit 204, a non-signal period estimation unit 205 and a switching timing control unit 206.

The forward destination setting instruction acquisition unit 201 acquires forward destination setting information form the route control device 102 (performs a forward destination setting instruction acquiring process). Here, the forward destination setting information is, for example, information of a forward destination such as a MAC (Media Access Control) address or an IP (Internet Protocol) address of a device that is the forward destination of input traffic.

The forward destination set unit 202 sets the forward destination of the input traffic based on the forward destination setting information acquired by the forward destination setting instruction acquisition unit 201 (performs a forward destination setting process). Here, in the configuration example (1), the timing of setting the forward destination by the forward destination set unit 202 for the forward unit 203 is controlled by the switching timing control unit 206 as described later.

The forward unit 203 outputs input traffic input from a previous device as output traffic to a next device based on the forward destination set by the forward destination set unit 202 (performs a forwarding process). Note that it is regarded that route switching is performed at the point of time when the forward destination is set by the forward destination set unit 202.

The traffic monitor unit 204 monitors traffic flowing in the forward unit 203 of the signal forwarding device 101 (performs a traffic monitoring process).

The non-signal period estimation unit 205 estimates a non-signal period based on the traffic monitored by the traffic monitor unit 204 (performs a non-signal period estimating process).

The switching timing control unit 206 controls the timing of setting the forward destination by the forward destination set unit 202 for the forward unit 203 such that route setting is performed in the non-signal period estimated by the non-signal period estimation unit 205 (performs a switching timing control process). Here, the forward unit 203 switches the forward destination from the point of time when the forward destination is set, and thus the timing of setting the forward destination by the switching timing control unit 206 for the forward unit 203 is referred to as a switching timing.

In FIG. 2, the route control device 102 includes a communication route calculation unit 301 and a forward destination setting instruction unit 302.

The communication route calculation unit 301 calculates a communication route of the plurality of signal forwarding devices 101 in response to a route switching request input from the outside (performs a communication route calculating process). Here, the route switching request is manually or automatically input from the outside, and for example, the route switching request is output at the time of changing the required bandwidth of the slave stations 703, at the time of cable construction or cable breakage in a particular section, at the time of changing the installation location of the master station 704 to be connected, or the like.

Based on the communication route calculated by the communication route calculation unit 301, the forward destination setting instruction unit 302 sends the forward destination setting information indicating the forward destination of the input traffic to the forward destination setting instruction acquisition unit 201 of each signal forwarding device 101 corresponding to the communication route (performs a forward destination setting instructing process).

In this manner, the signal forwarding devices 101 according to the configuration example (1) of the first embodiment can set the forward destination of the input traffic in the non-signal period of the traffic based on the forward destination setting information acquired from the route control device 102. In particular, the configuration example (1) has an advantage in that there is no need to make any additional change to the route control device 102 and the route control device 102 having the same configuration as the conventional route control device 702 can be used.

Configuration Example (2)

Figure 3:
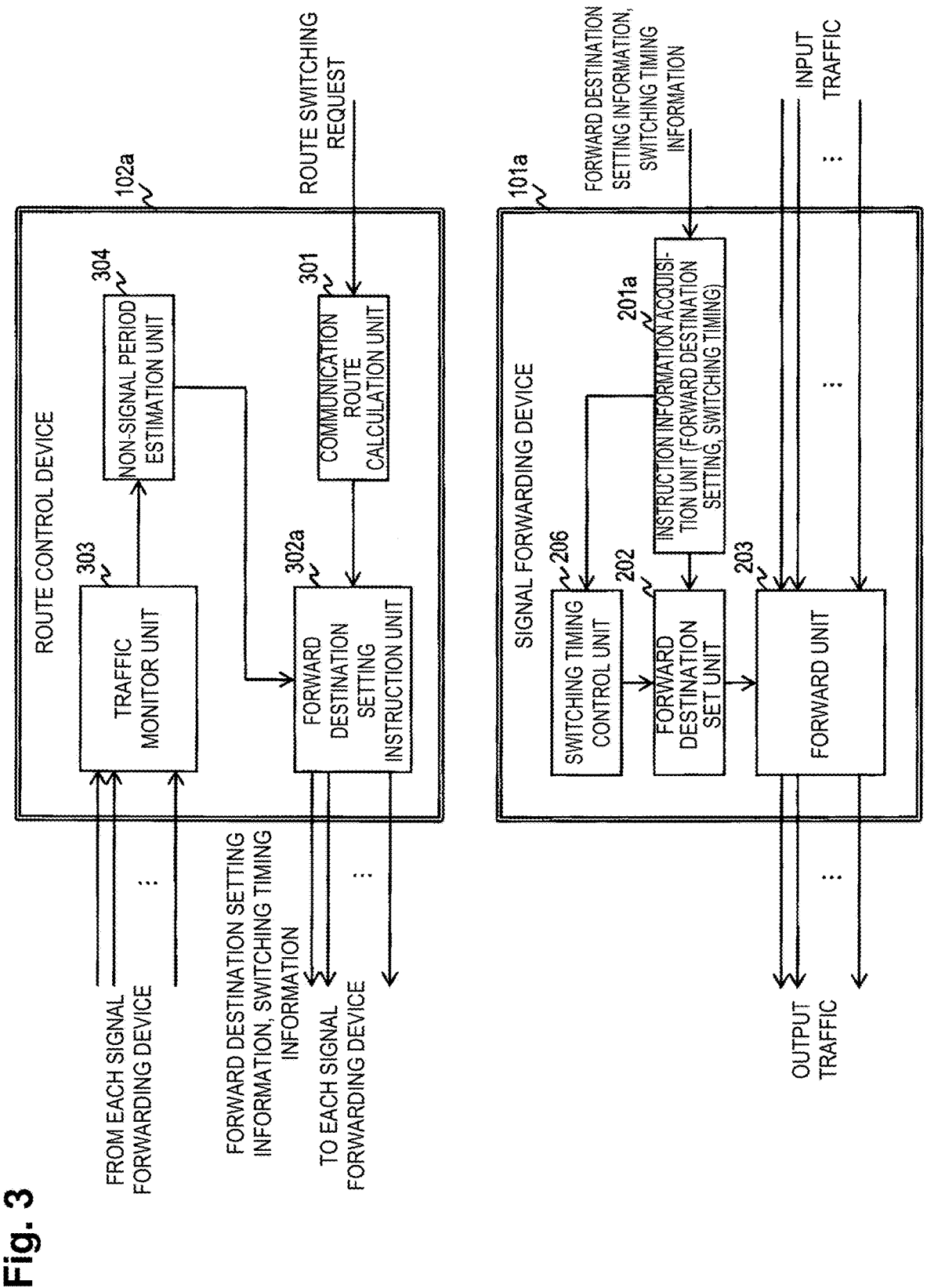
FIG. 3 is a diagram showing a configuration example (2) of the signal forwarding device and the route control device according to the first embodiment.

FIG. 3 shows a configuration example (2) of a signal forwarding device 101a and a route control device 102a according to the first embodiment. Note that, in the configuration example (2), the plurality of signal forwarding devices 101 and the route control device 102 of the signal forwarding system 100 described in FIG. 1 correspond to the signal forwarding device 101a and the route control device 102a shown in FIG. 3, respectively.

In FIG. 3, the signal forwarding device 101a includes an instruction information acquisition unit 201a, a forward destination set unit 202, a forward unit 203 and a switching timing control unit 206.

The forward destination set unit 202 and the forward unit 203 operate in the same way as those of the signal forwarding device 101 in the configuration example (1), and overlapping descriptions will be omitted.

The instruction information acquisition unit 201a corresponds the forward destination setting instruction acquisition unit 201 of the signal forwarding device 101 in the configuration example (1), and in the configuration example (2), not only acquires the forward destination setting information from the route control device 102a but also acquires information regarding a timing of switching the forward destination (switching timing information) from the route control device 102a.

The switching timing control unit 206 operates in the same way as in the configuration example (1), and controls the timing of setting the forward destination by the forward destination set unit 202 for the forward unit 203 such that route switching is performed in the non-signal period of the traffic based on the switching timing information acquired by the instruction information acquisition unit 201a from the route control device 102a.

In FIG. 3, the route control device 102a includes a communication route calculation unit 301, a forward destination setting instruction unit 302a, a traffic monitor unit 303 and a non-signal period estimation unit 304. Here, a difference from the configuration example (1) is that the traffic monitor unit 204 and the non-signal period estimation unit 205 included in the signal forwarding device 101 in the configuration example (1) are included in the route control device 102a as the traffic monitor unit 303 and the non-signal period estimation unit 304, respectively.

Here, the communication route calculation unit 301 operates in the same way as that of the route control device 102 in the configuration example (1), and overlapping descriptions will be omitted.

Based on the communication route calculated by the communication route calculation unit 301, the forward destination setting instruction unit 302a sends the forward destination setting information indicating the forward destination of the input traffic to the instruction information acquisition unit 201a of each signal forwarding device 101a corresponding to the communication route. Further, the forward destination setting instruction unit 302a sends the switching timing information to each signal forwarding device 101a such that route setting is performed in the non-signal period of the traffic estimated by the non-signal period estimation unit 304 as described later.

The traffic monitor unit 303 monitors the traffic flowing in the forward unit 203 of the signal forwarding device 101a in the same way as the traffic monitor unit 204 in the configuration example (1). Here, while the traffic monitor unit 204 in the configuration example (1) only monitors the traffic of its own signal forwarding device 101, the traffic monitor unit 303 in the configuration example (2) remotely monitors the respective traffic of the plurality of signal forwarding devices 101a.

The non-signal period estimation unit 304 estimate a non-signal period for each signal forwarding device 101a based on the traffic of each signal forwarding device 101a monitored by the traffic monitor unit 303. In the configuration example (2), the non-signal period estimation unit 304 then outputs the estimated non-signal period to the forward destination setting instruction unit 302a.

In this manner, in the signal forwarding device 101a and the route control device 102a according to the configuration example (2) of the first embodiment, the traffic monitor unit 303 and the non-signal period estimation unit 304 are arranged in the route control device 102a, and thus there is an advantage that there is no need to arrange each signal forwarding device 101 unlike in the configuration example (1) and functions can be integrated in the route control device 102a.

Configuration Example (3)

Figure 4:
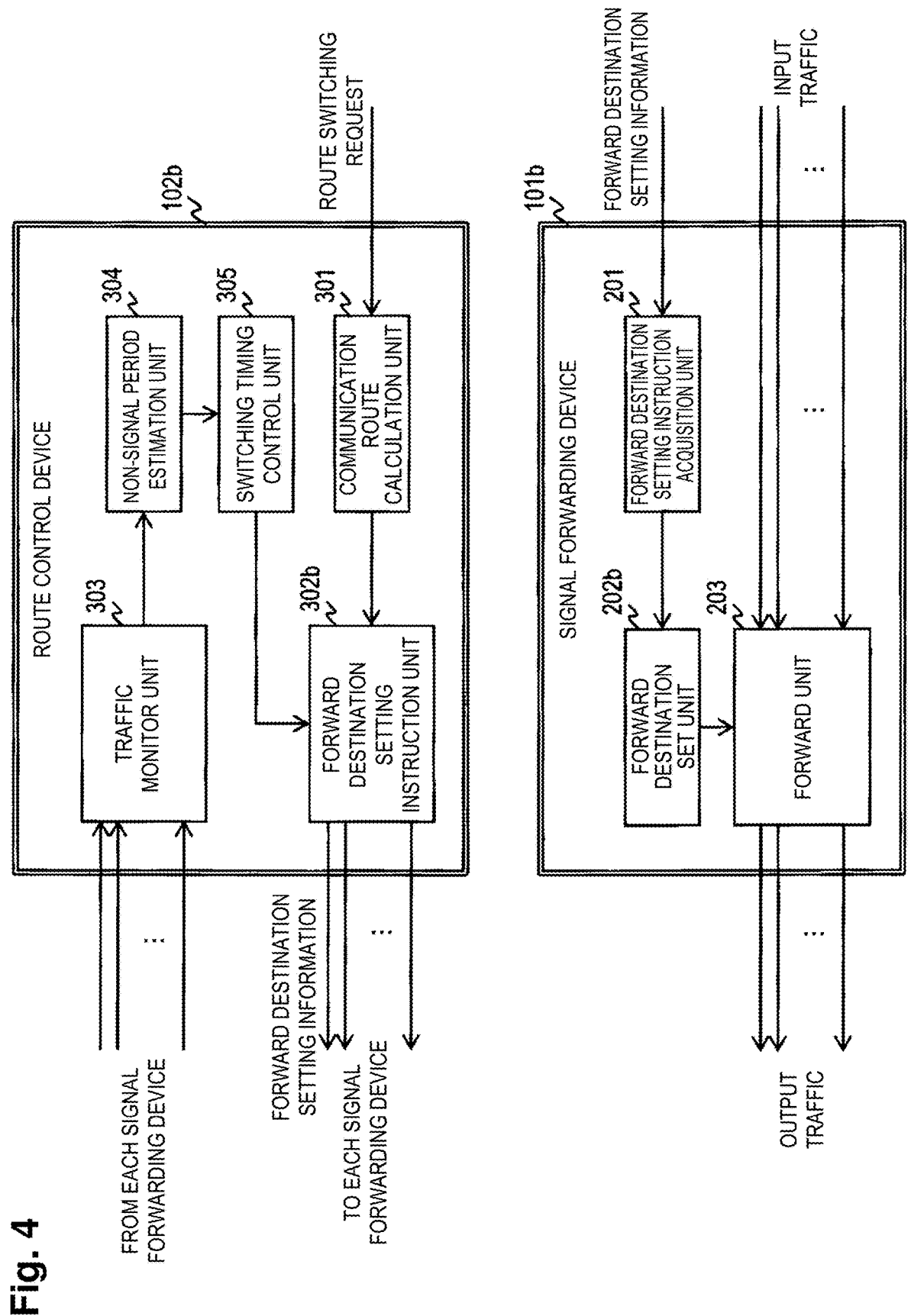
FIG. 4 is a diagram showing a configuration example (3) of the signal forwarding device and the route control device according to the first embodiment.

FIG. 4 shows a configuration example (3) of a signal forwarding device 101b and a route control device 102b according to the first embodiment. Note that, in the configuration example (3), the plurality of signal forwarding devices 101 and the route control device 102 of the signal forwarding system 100 described in FIG. 1 correspond to the signal forwarding device 101b and the route control device 102b shown in FIG. 4, respectively. Here, in the configuration example (3), the signal forwarding device 101b in FIG. 4 has the same configuration as the signal forwarding device 701 in FIG. 12 described for the prior art, and only the configuration of the route control device 102b is different from that of the route control device 702 described for the prior art.

In FIG. 4, the signal forwarding device 101b includes a forward destination setting instruction acquisition unit 201, a forward destination set unit 202b and a forward unit 203. Here, the forward destination setting instruction acquisition unit 201 and the forward unit 203 operate in the same way as those of the signal forwarding device 101 in the configuration example (1), and overlapping descriptions will be omitted.

The forward destination set unit 202b changes the forward destination based on the forward destination setting information acquired by the forward destination setting instruction acquisition unit 201. Although the switching timing is controlled by the switching timing control unit 206 in the forward destination set unit 202 in the configuration example (1), the forward destination set unit 202b in the configuration example (3) sets the forward destination of the input traffic for the forward unit 203 based on the forward destination setting information acquired by the forward destination setting instruction acquisition unit 201 in the same way as the forward destination set unit 902 described for the prior art. Here, the route switching is performed at the timing when the forward destination is set for the forward unit 203.

In FIG. 4, the route control device 102b includes a communication route calculation unit 301, a forward destination setting instruction unit 302b, a traffic monitor unit 303, a non-signal period estimation unit 304 and a switching timing control unit 305. Here, a difference from the configuration example (2) is that the switching timing control unit 206 included in the signal forwarding device 101a in the configuration example (2) is included in the route control device 102b as the switching timing control unit 305. Note that the communication route calculation unit 301, the traffic monitor unit 303 and the non-signal period estimation unit 304 operate in the same way as those of the route control device 102a in the configuration example (2), and overlapping descriptions will be omitted.

The switching timing control unit 305 controls the timing of sending the forward destination setting information to the signal forwarding device 101b such that route switching is performed in the non-signal period estimated by the non-signal period estimation unit 304. Here, in the signal forwarding device 101b, since the forward destination is set by the forward destination set unit 202b for the forward unit 203 according to the timing of receiving the forward destination setting information from the route control device 102b, the route switching can be performed in agreement with the non-signal period by controlling the timing of sending the forward destination setting information by the switching timing control unit 305 to the signal forwarding device 101b. Note that the switching timing control unit 305 controls the timing of sending the forward destination setting information to the signal forwarding device 101b such that the route switching is performed in the non-signal period by considering the time required for sending the forward destination setting information.

The forward destination setting instruction unit 302b sends the forward destination setting information based on the communication route calculated by the communication route calculation unit 301 to the signal forwarding device 101b according to the timing of output by the switching timing control unit 305.

In this manner, in the signal forwarding device 101b according to the configuration example (3) in the first embodiment, since the traffic monitor unit 303, the non-signal period estimation unit 304 and the switching timing control unit 305 are arranged in the route control device 102b, there is an advantage that the signal forwarding device 101b can be realized with the same configuration as the conventional signal forwarding device 701 and there is no need to make any additional change.

Figure 10:
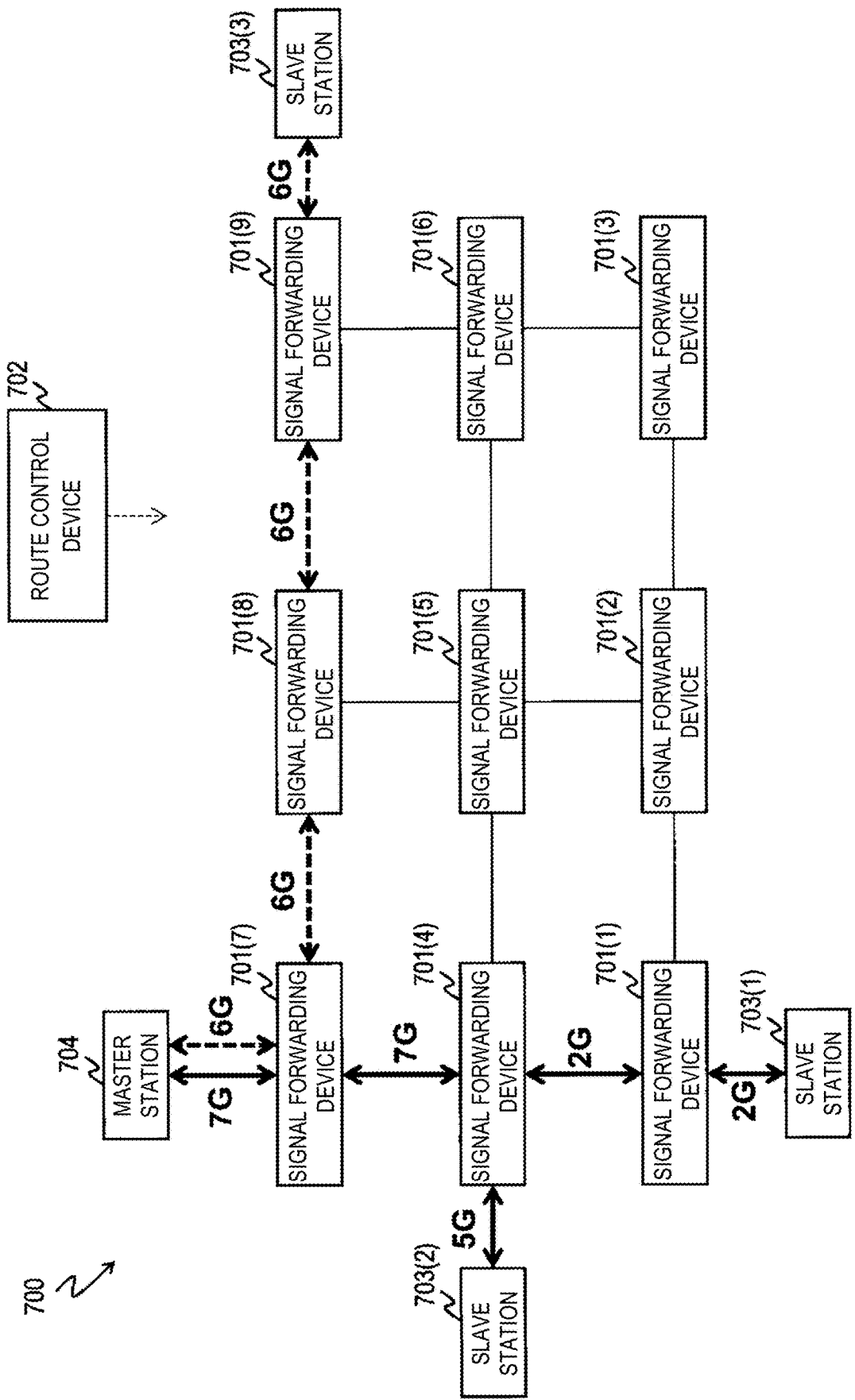
FIG. 10 is a diagram showing an example where a route having the minimum hop count is assigned to the communication between slave stations and a master station.
Figure 11:
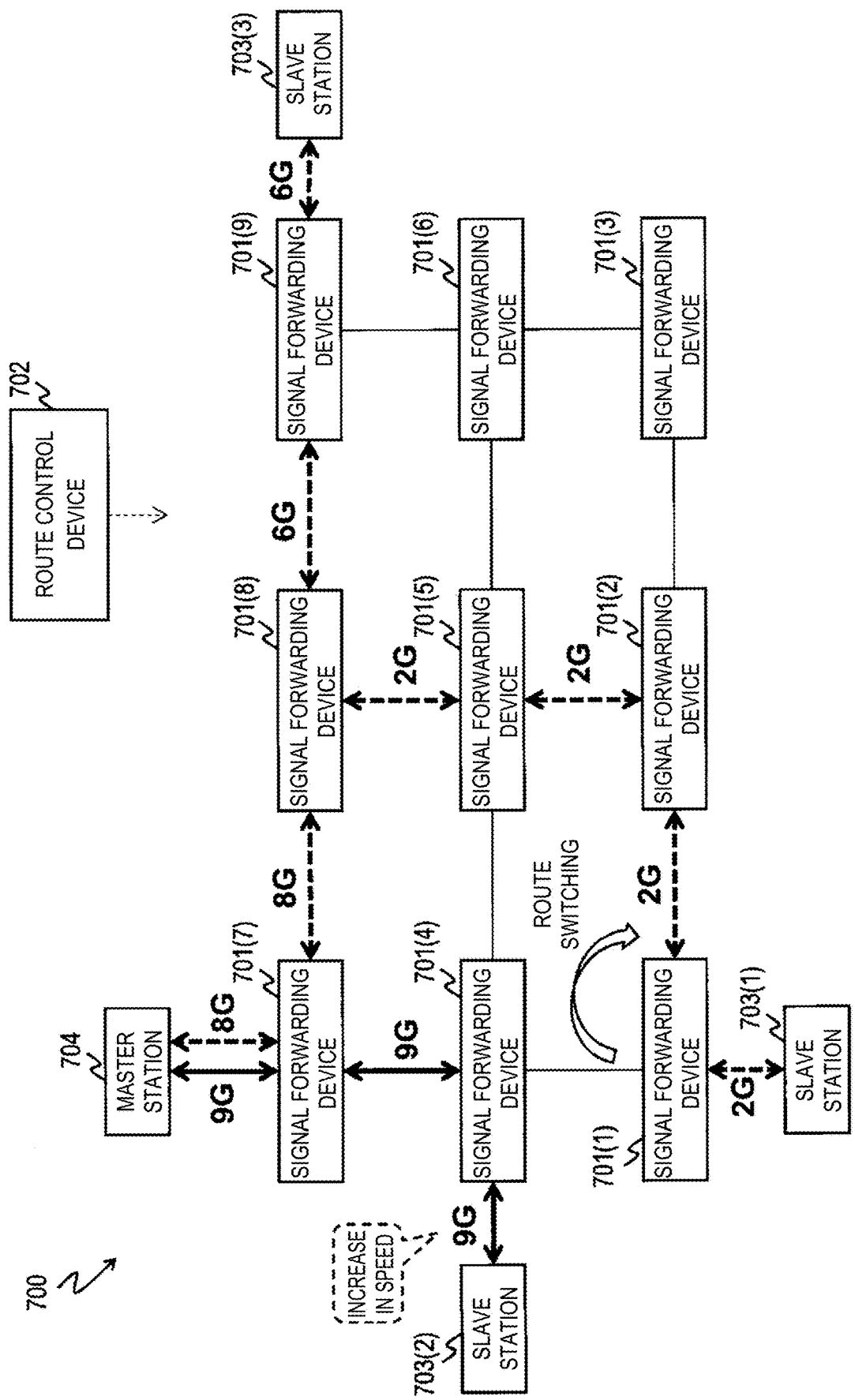
FIG. 11 is a diagram showing an example of switching a route such that a required bandwidth is equal to or less than a transmission capacity.
Figure 13:
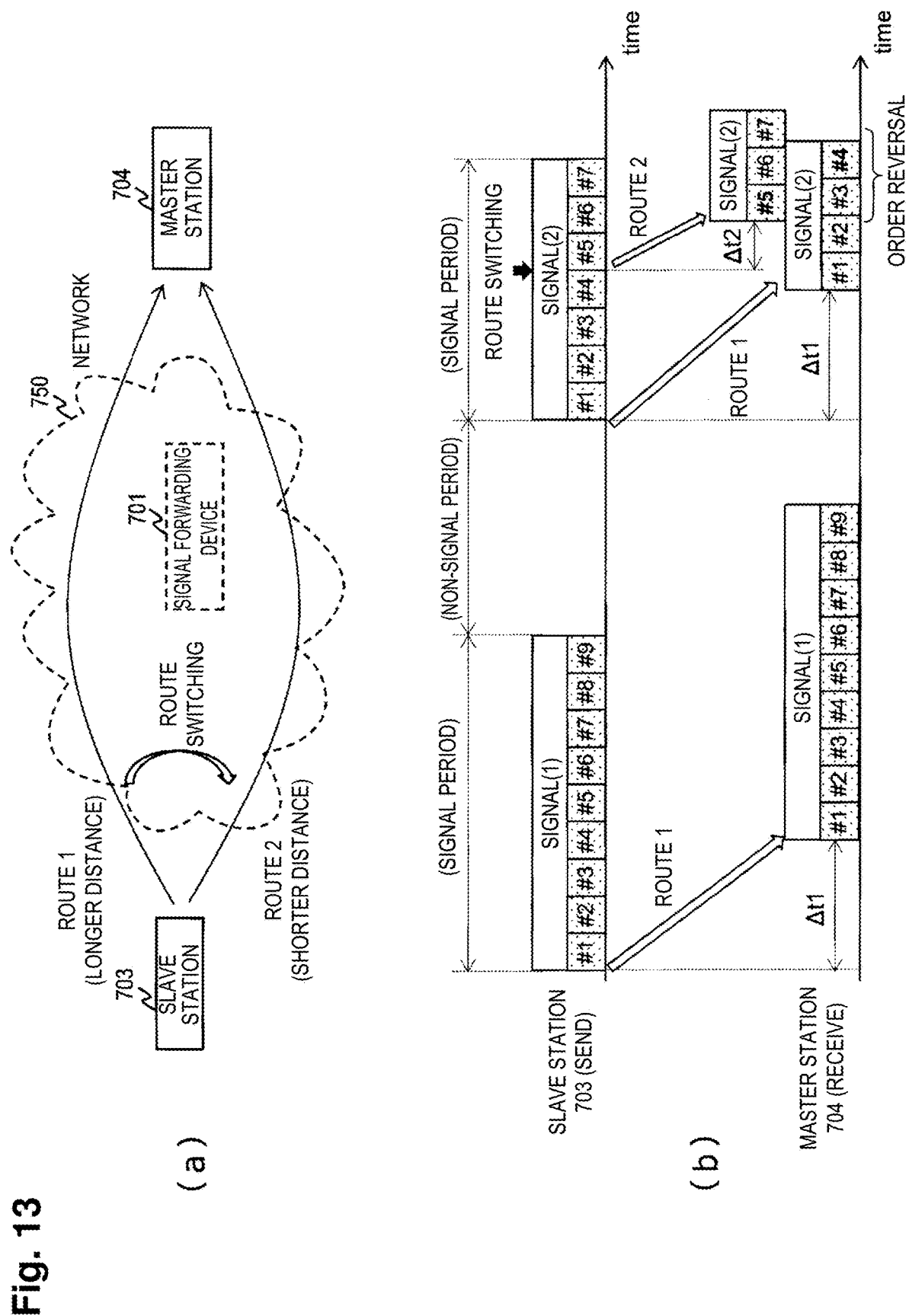
FIG. 13 is a diagram showing an example of a prior art problem.

The configuration examples (1) to (3) have been described above as three configuration examples of the signal forwarding device 101 and the route control device 102 of the signal forwarding system 100 in FIG. 1 according to this embodiment. In any configuration, since the route switching is performed in the non-signal period, the route switching in the signal period as described in FIG. 13(b) can be prevented even when the route switching is performed from the state of FIG. 10 to the state of FIG. 11 as described for the prior art. As a result, in the above-described configuration examples, even in the case of switching from a route with a larger delay time to a route with a smaller delay time, the switching of the communication route can be performed without the reversal of the order of received frames.

Here, in the signal forwarding system 100 according to the first embodiment described above, as long as the signal forwarding device (101, 101*a*, 101*b*) and the route control device (102, 102*a*, 102*b*) jointly have the three functions of the function of traffic monitoring (the traffic monitor unit (204, 303)), the function of estimating the non-signal period in which no traffic flows based on the monitored traffic (the non-signal period estimation unit (205, 304)) and the function of controlling the timing of switching the communication route such that the route switching is performed in the estimated non-signal period (the switching timing control unit (206, 305)) in the three configuration example of the configuration example (1), the configuration example (2) and the configuration example (3), the same effect can be obtained even with other configurations.

Operation Example (1)

Figure 5:
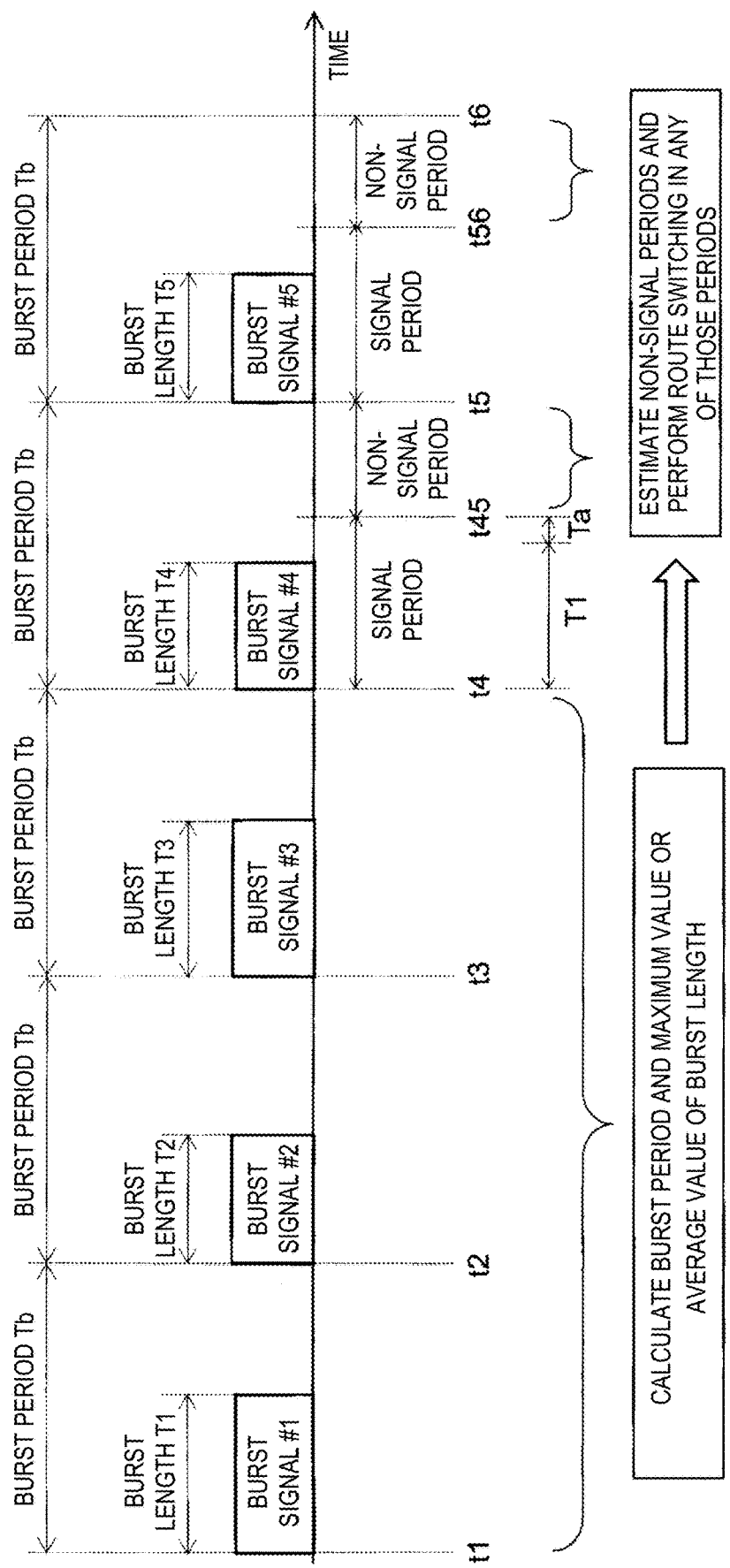
FIG. 5 is a diagram showing an operation example (1) of the signal forwarding system according to a first embodiment.

FIG. 5 shows an operation example (1) of the signal forwarding system 100 according to the first embodiment. This operation example makes use of the fact that traffic communicated between the slave stations 103 and the master station 104 has burstiness (see Non-Patent Literature 2, for example). Note that this operation example (1) corresponds to the configuration example (1), configuration example (2) and configuration example (3) described earlier.

In FIG. 5, a burst signal #1, a burst signal #2, a burst signal #3, a burst signal #4 and a burst signal #5 are shown as examples of traffic having burstiness with the horizontal axis as a time axis. The burst signal #1 is from time t1 to t2, the burst signal #2 is from time t2 to t3, the burst signal #3 is from time t3 to t4, the burst signal #4 is from time t4 to t5 and the burst signal #5 is from time t5 to t6, and they all have a burst period of Tb. Each burst signal has a different length, and for example, the burst signal #1 has a burst length of T1, the burst signal #2 has a burst length of T2, the burst signal #3 has a burst length of T3, the burst signal #4 has a burst length of T4 and the burst signal #5 has a burst length of T5.

Here, when traffic has burstiness as in the example of FIG. 5, there is a tendency that the signal is concentrated near the beginning of the burst period and the signal does not flow near the end of the burst period. Thus, in this embodiment, the traffic monitor unit 204 (traffic monitor unit 303) monitors traffic, the non-signal period estimation unit 205 (non-signal period estimation unit 304) calculates the burst period and the maximum value or the average value of the burst length, estimates a signal period as a period from the start time point of the burst period to a point of time after the maximum value or the average value of the burst length plus a certain adjustment time and estimates a non-signal period as a period from the end time point of the signal period to the end time point of the burst period, and controls the timing of setting a forward destination by the switching timing control unit 206 (switching timing control unit 305) for the forward unit 203 such that route switching is performed in the non-signal period. Here, the certain adjustment time is a time for adjustment for dealing with the incoming of a burst signal having a longer burst length than before in a subsequent burst period, and can be set to any time.

For example, in FIG. 5, the non-signal period estimation unit 205 (non-signal period estimation unit 304) calculates the burst period and the maximum value or the average value of the burst length by regarding the burst signal #1, the burst signal #2 and the burst signal #3 as reference signals. In the example of FIG. 5, the burst period, Tb, can be calculated as the average value of (t2−t1), (t3−t2) and (t4−t3). The maximum value of the burst length can be calculated as the maximum value or the average value of the burst length T1, the burst length T2 and the burst length T3. When the burst length T1 is calculated as the maximum value, for example, the signal period and the non-signal period are estimated as a time (T1+Ta) obtained by adding a certain adjustment time Ta to the burst length T1 and a period from the end time point of the signal period to the end time point of the burst period Tb, respectively. In the example of FIG. 5, in the burst signal #4 next to the burst signal #1, burst signal #2 and burst signal #3, on which the estimation is performed, a period from the start time point t4 of the burst signal #4 to time t45 after the burst length T1 plus the certain adjustment time Ta is the signal period, and a period from the end time point t45 of the signal period to the end time point t5 of the burst period Tb is estimated as the non-signal period. Note that, for the burst signal #5 as well, a period from t56 to t6 is estimated as the non-signal period.

In this manner, the signal forwarding system 100 according to the first embodiment can estimate the non-signal period by monitoring traffic of the signal forwarding device 101 and control the switching timing to perform the route switching in the non-signal period. Note that the switching timing control unit 206 (switching timing control unit 305) may set the switching timing to any time in the non-signal period. However, it is preferable to perform processes such as avoiding a predetermined time immediately after the beginning of the non-signal period or avoiding a predetermined time near the end of the non-signal period in order to deal with an estimation error of the non-signal period.

Operation Example (2)

Figure 6:
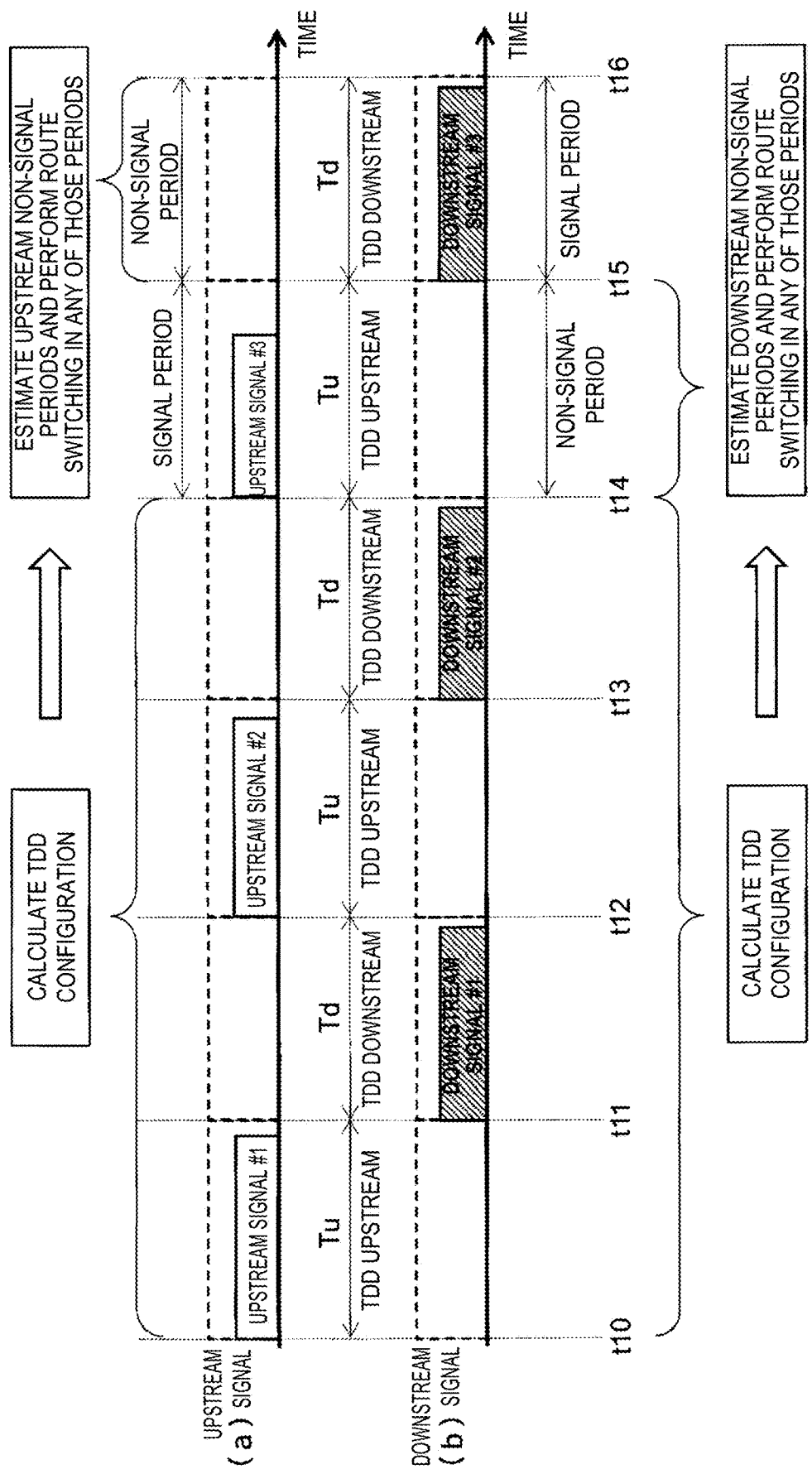
FIG. 6 is a diagram showing an operation example (2) of the signal forwarding system according to a first embodiment.

FIG. 6 shows an operation example (2) of the signal forwarding system 100 according to the first embodiment. In this operation example, a TDD (Time Division Duplex) period is used as the non-signal period. Note that this operation example (2) corresponds to the configuration example (1), configuration example (2) and configuration example (3) described earlier. A known technique such as in Non-Patent Literature 3 can be used as a method for estimating the TDD period. In the case of TDD, downstream and upstream communication times are alternately repeated, for example, so as to avoid overlap. That is, in TDD, a downstream communication corresponds to a non-signal period in a period of time in which an upstream communication is performed, and an upstream communication corresponds to a non-signal period in a period of time in which a downstream communication is performed.

In FIG. 6, the horizontal axis is a time axis, and (a) and (b) show upstream signals from the slave stations 103 to the master station 104 and downstream signals from the master station 104 to the slave stations 103, respectively. In FIG. 6, each period from time t10 to t11, from t12 to t13, from t14 to t15 is a TDD upstream period Tu. Each period from time t11 to t12, from t13 to t14, from t15 to t16 is a TDD downstream period Td.

Here, the signal forwarding system 100 according to this operation example (2) calculates a TDD configuration composed of upstream signals and downstream signals, estimates each of an upstream non-signal period and a downstream non-signal period, and controls route switching to be performed in the non-signal period, as in the example of FIG. 6.

For the upstream signals of FIG. 6(*a*) and downstream signals of FIG. 6(*b*), the TDD configuration in the period from time t10 to t14 is calculated, for example. Here, in calculating the TDD configuration, the TDD upstream period Tu and TDD downstream period Td can be calculated based on the start time point t10 of the upstream signal #1, the start time point t12 of the upstream signal #2, the start time point t14 of the upstream signal #3, the start time point t11 of the downstream signal #1 and the start time point t13 of the downstream signal #2, for example. Then, the non-signal period estimation unit 205 (non-signal period estimation unit 304) can estimate that the signal period of the upstream signals is from time t14 to t15 and the non-signal period of the upstream signals is from time t15 to t16, and can similarly estimate that the non-signal period of the downstream signals is from time t14 to t15 and the signal period of the downstream signals is from time t15 to t16.

In this manner, in the signal forwarding system 100 according to this operation example (2), the traffic monitor unit 204 (traffic monitor unit 303) monitors traffic of upstream signals and downstream signals, the non-signal period estimation unit 205 (non-signal period estimation unit 304) calculates the TDD configuration and then separately estimates the non-signal periods of the upstream signals and downstream signals, the switching timing control unit 206 (switching timing control unit 305) controls the timing of route switching to perform route switching of the downstream signals in the non-signal period of the upstream signals and perform route switching of the upstream signals in the non-signal period of the downstream signals.

Operation Example (3)

The operation example (3) described below is suitable for a case where a network (L2NW) is used as MFH for forwarding frames between devices into which a base station of a cellular system is separately arranged as a wireless control device and a wireless device, for example. Here, in order to satisfy strict delay requirements of MFH, the standardization of TSN (Time Sensitive Network) is under development (see Non-Patent Literature 1, for example). The TAS (Time Aware Shaper) technique discussed in the TSN is a manner that is particularly efficient for a case where traffic with higher priority has periodicity, and traffic is scheduled by priority and the communicability is switched by priority. Specifically, control is periodically repeated such that only traffic with higher priority is forwarded and traffic with lower priority is not forwarded during a period of time in which the traffic with higher priority arrives at the signal forwarding device and traffic with lower priority is forwarded in the non-signal period in which no traffic with higher priority flows. The signal forwarding system 100 according to this operation example (3) makes use of this TAS technique.

Figure 7:
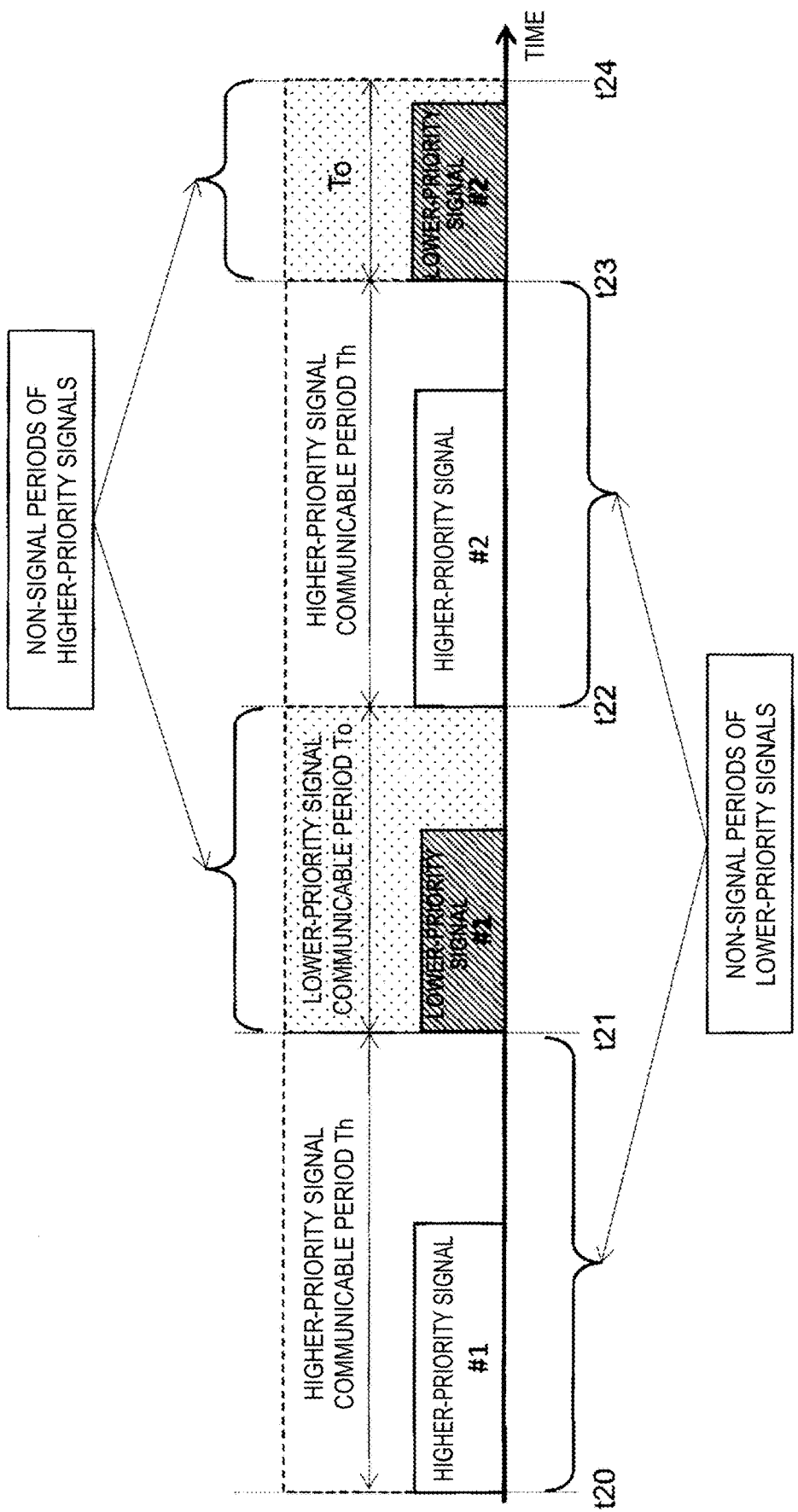
FIG. 7 is a diagram showing an operation example (3) of the signal forwarding system according to a first embodiment.

FIG. 7 shows an operation example (3) of the signal forwarding system 100 according to the first embodiment. In FIG. 7, the horizontal axis indicates a time axis, and a higher-priority signal #1, a lower-priority signal #1, a higher-priority signal #2 and a lower-priority signal #2 are periodically repeated. For example, the higher-priority signal #1 is forwarded in a higher-priority signal communicable period Th from time t20 to t21, and the higher-priority signal #2 is forwarded in a higher-priority signal communicable period Th from time t22 to t23. The lower-priority signal #1 is forwarded in a lower-priority signal communicable period To from time t21 to t22, and the lower-priority signal #2 is forwarded in a lower-priority signal communicable period To from time t23 to t24. Thus, in the TAS technique, a period in which traffic with higher priority can be transmitted (higher-priority signal communicable period) and a period in which traffic with lower priority can be transmitted (lower-priority signal communicable period) are periodically repeated at a preset time.

Thus, this operation example (3) can be realized in any of the configuration example (1), the configuration example (2) and the configuration example (3) described earlier, and in this case, the traffic monitor unit 204 (traffic monitor unit 303) monitors traffic of higher-priority signals and traffic of lower-priority signals. The non-signal period estimation unit 205 (non-signal period estimation unit 304) separately estimates a non-signal period of the traffic of the higher-priority signals (lower-priority signal communicable period To) and a non-signal period of the traffic of the lower-priority signals (higher-priority signal communicable period Th). The switching timing control unit 206 (switching timing control unit 305) controls the timing of route switching to perform route switching of the traffic of the lower-priority signals in the higher-priority signal communicable period Th and perform route switching of the traffic of the higher-priority signals in the lower-priority signal communicable period To.

Note that this operation example (3) can not only be realized in the configurations described in the configuration example (1) in FIG. 2, the configuration example (2) in FIG. 3 and the configuration example (3) in FIG. 4, but can also be more effectively realized in the configuration example (4) described below.

Configuration Example (4)

Figure 8:
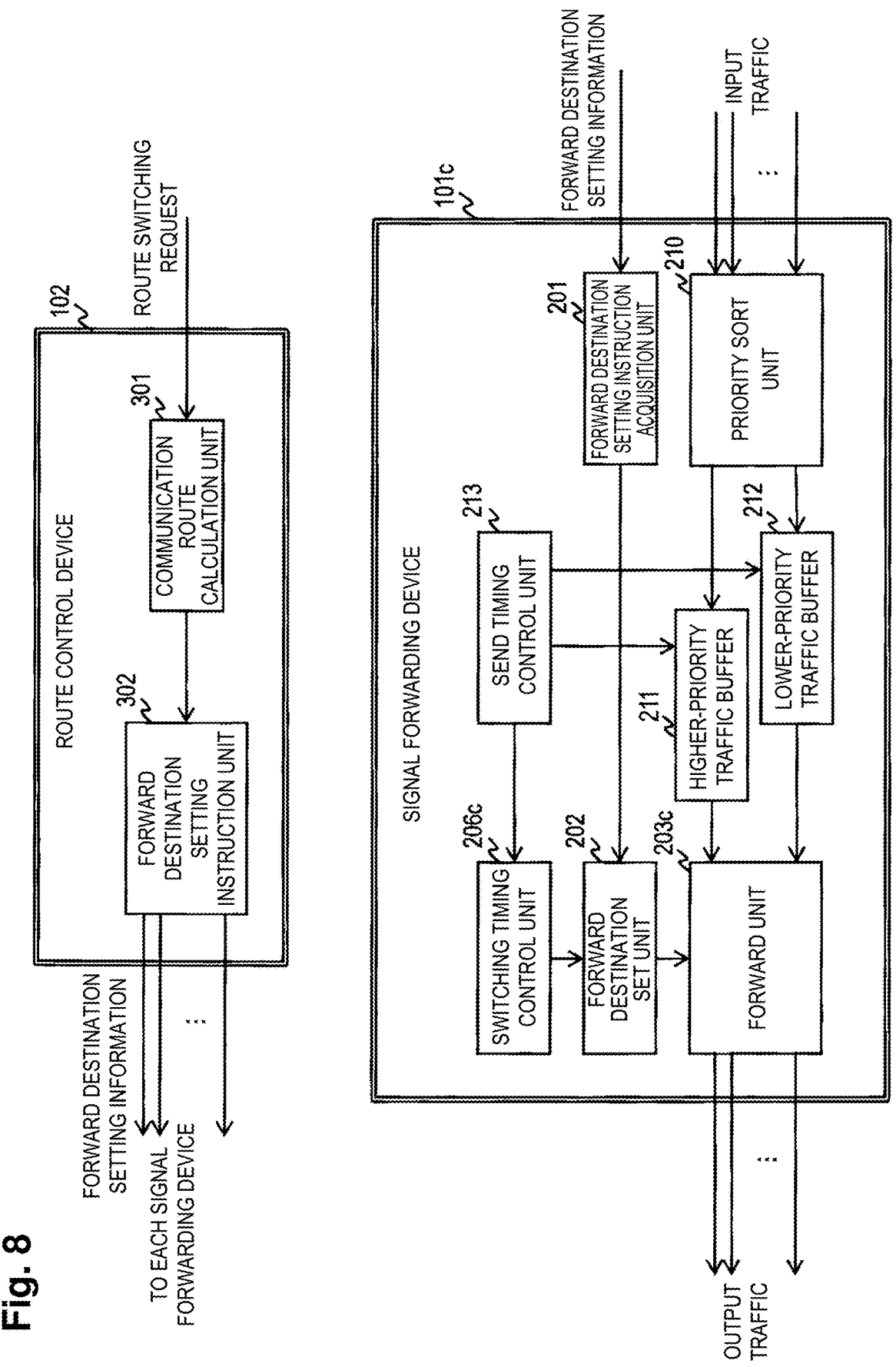
FIG. 8 is a diagram showing a configuration example (4) of the signal forwarding device and the route control device realizing the operation example (3).

FIG. 8 shows a configuration example (4) of a signal forwarding device 101c and a route control device 102 realizing the operation example (3). Here, the route control device 102 has the same configuration as the route control device 102 described in the configuration example (1). In this configuration example (4), by making use of the fact that a communicable period of higher-priority signals corresponds to a non-signal period of lower-priority signals and a communicable period of lower-priority signals corresponds to a non-signal period of higher-priority signals in communication using the TAS technique as described in the operation example (3), route switching of the traffic of the higher-priority signals is performed in the communicable period of the lower-priority signals and route switching of the traffic of the lower-priority signals is performed in the communicable period of the higher-priority signals.

In FIG. 8, the signal forwarding device 101c includes a forward destination setting instruction acquisition unit 201, a forward destination set unit 202, a forward unit 203c, a switching timing control unit 206c, a priority sort unit 210, a higher-priority traffic buffer 211, a lower-priority traffic buffer 212 and a send timing control unit 213.

Here, the forward destination setting instruction acquisition unit 201 and the forward destination set unit 202 operate in the same way as those of the signal forwarding device 101 in the configuration example (1), and overlapping descriptions will be omitted.

The forward unit 203c outputs traffic read from the higher-priority traffic buffer 211 and the lower-priority traffic buffer 212, which will be described later, as output traffic to a next device based on the forward destination set by the forward destination set unit 202.

The switching timing control unit 206c controls the timing of setting the forward destination by the forward destination set unit 202 for the forward unit 203 based on an output timing of a signal output by the send timing control unit 213, which will be described later. For example, the switching timing control unit 206c sets a forward destination of the traffic of the higher-priority signals and performs route switching when the timing output by the send timing control unit 213 is of the lower-priority signals (is in the communicable period of the lower-priority signals), and sets a forward destination of the traffic of the lower-priority signals and performs route switching when the timing output by the send timing control unit 213 is of the higher-priority signals (is in the communicable period of the higher-priority signals).

The priority sort unit 210 sorts input traffic by priority, and outputs the traffic of the higher-priority signals to the higher-priority traffic buffer 211 and the traffic of the lower-priority signals to the lower-priority traffic buffer 212, respectively.

The higher-priority traffic buffer 211 temporarily holds the traffic of the higher-priority signals sorted by the priority sort unit 210.

The lower-priority traffic buffer 212 temporarily holds the traffic of the lower-priority signals sorted by the priority sort unit 210.

The send timing control unit 213 controls the output timing of outputting respective traffic from the higher-priority traffic buffer 211 or the lower-priority traffic buffer 212 to the forward unit 203 based on the preset higher-priority signal communicable period and lower-priority signal communicable period as described in FIG. 7, and notifies the switching timing control unit 206c of the output timing.

In this manner, the signal forwarding device 101c according to the configuration example (4) can be realized by only implementing the send timing control unit 213 in the configuration of a conventional TAS-based signal forwarding device and notifying the switching timing control unit 206c of the output timing of output from the higher-priority traffic buffer 211 and the lower-priority traffic buffer 212 to the forward unit 203, and thus has an advantage in that it can be easily implemented in a conventional TAS-based signal forwarding device.

As described in each embodiment above, in the signal forwarding system, the signal forwarding device, the route control device and the signal forwarding method according to the present invention, by switching between communication routes at a timing when no traffic is flowing in the signal forwarding device, the switching between the communication routes can be performed without reversal of the order of received frames even in the case of switching from a route with a larger delay time to a route with a smaller delay time.

REFERENCE SIGNS LIST

100 Signal forwarding system
101, 101a, 101b, 101c, 701 Signal forwarding device
102, 102a, 102b, 702 Route control device
103, 703 slave station
104, 704 master station
201, 901 forward destination setting instruction acquisition unit
201a instruction information acquisition unit
202, 202b, 902 forward destination set unit
203, 903 forward unit
210 priority sort unit
211 higher-priority traffic buffer
212 lower-priority traffic buffer
213 send timing control unit
301, 801 communication route calculation unit
302, 302a, 302b, 802 forward destination setting instruction unit
204, 303 traffic monitor unit
205, 304 non-signal period estimation unit
206, 206c, 305 switching timing control unit
750 network

The invention claimed is:

1. A signal forwarding system comprising: a plurality of signal forwarding devices forming a plurality of communication routes between a slave station and a master station; and a route control device that determines a communication route of a signal communicated between the slave station and the master station, wherein
   the route control device comprises at least a first one or more processors and a first one or more storage mediums having first computer program instructions stored thereon that, when executed by the first one or more processors, perform to: calculate a forward destination communication route in response to a route switching request; and output forward destination setting information to the signal forwarding devices based on the communication route calculated,
   the signal forwarding devices comprise at least a second one or more processors and a second one or more storage mediums having second computer program instructions stored thereon that, when executed by the second one or more processors, perform to: acquire the forward destination setting information from the route control device; change a forward destination of the signal based on the forward destination setting information acquired; and outputs input traffic based on the forward destination, and
   any of the first and second computer program instructions, when executed, further perform to:
   monitor the traffic;
   estimate a non-signal period in which the traffic does not flow based on the traffic monitored; and
   control a timing of switching the communication route to perform route switching in the non-signal period estimated.

2. The signal forwarding system according to claim 1, wherein the any of the first and second computer program instructions, when executed, further perform to: calculate a burst period and a maximum value or an average value of a burst length of the input traffic, and estimate the non-signal period as a period from a point of time after the maximum value or the average value of the burst length plus a predetermined adjustment time from the burst period to an end of the burst period.

3. The signal forwarding system according to claim 1, wherein the any of the first and second computer program instructions, when executed, further perform to: monitor upstream and downstream traffic,
   separately estimate an upstream non-signal period and a downstream non-signal period according to a Time Division Duplex (TDD) configuration, and
   control the timing of switching the communication route to perform downstream route switching in the upstream non-signal period and perform upstream route switching in the downstream non-signal period.

4. The signal forwarding system according to claim 1, wherein the any of the first and second computer program instructions, when executed, further perform to: monitor higher-priority traffic and lower-priority traffic,
   separately estimate a non-signal period of the higher-priority traffic or a communicable period of a lower-priority signal and a non-signal period of the lower-priority traffic or a communicable period of a higher-priority signal, and control the timing of switching the communication route to perform route switching of the lower-priority traffic in the communicable period of the higher-priority signal and perform route switching of the higher-priority traffic in the communicable period of the lower-priority signal.

5. A route control device that controls a plurality of signal forwarding devices forming a plurality of communication routes between a slave station and a master station and determines a communication route of a signal communicated between the slave station and the master station, wherein the route control device comprises:
a processor; and
a storage medium having computer program instructions stored thereon, when executed by the processor, perform to:
calculate a forward destination communication route in response to a route switching request; and
output forward destination setting information to the signal forwarding devices based on the communication route,
monitor traffic of the signal forwarding devices;
estimate a non-signal period in which the traffic does not flow based on the traffic monitored; and
control a timing of switching the communication route to perform route switching in the non-signal period.

6. A signal forwarding method in a signal forwarding system comprising: a slave station; a master station; a plurality of signal forwarding devices forming a plurality of communication routes between the slave station and the master station; and a route control device that determines a communication route of a signal communicated between the slave station and the master station, wherein the route control device performs at least: a communication route calculating process of calculating a forward destination communication route in response to a route switching request; and a forward destination setting instructing process of outputting forward destination setting information to the signal forwarding devices based on the communication route calculated in the communication route calculating process, the signal forwarding devices perform at least: a forward destination setting instruction acquiring process of acquiring the forward destination setting information from the route control device; a forward destination setting process of changing a forward destination of the signal based on the forward destination setting information acquired in the forward destination setting instruction acquiring process; and a forwarding process of outputting input traffic based on the forward destination, and any of the route control device and the signal forwarding devices performs:

a traffic monitoring process of monitoring the traffic;
a non-signal period estimating process of estimating a non-signal period in which the traffic does not flow based on the traffic monitored in the traffic monitoring process; and
a switching timing control process of controlling a timing of switching the communication route to perform route switching in the non-signal period estimated in the non-signal period estimating process.

* * * * *